Figure 1:
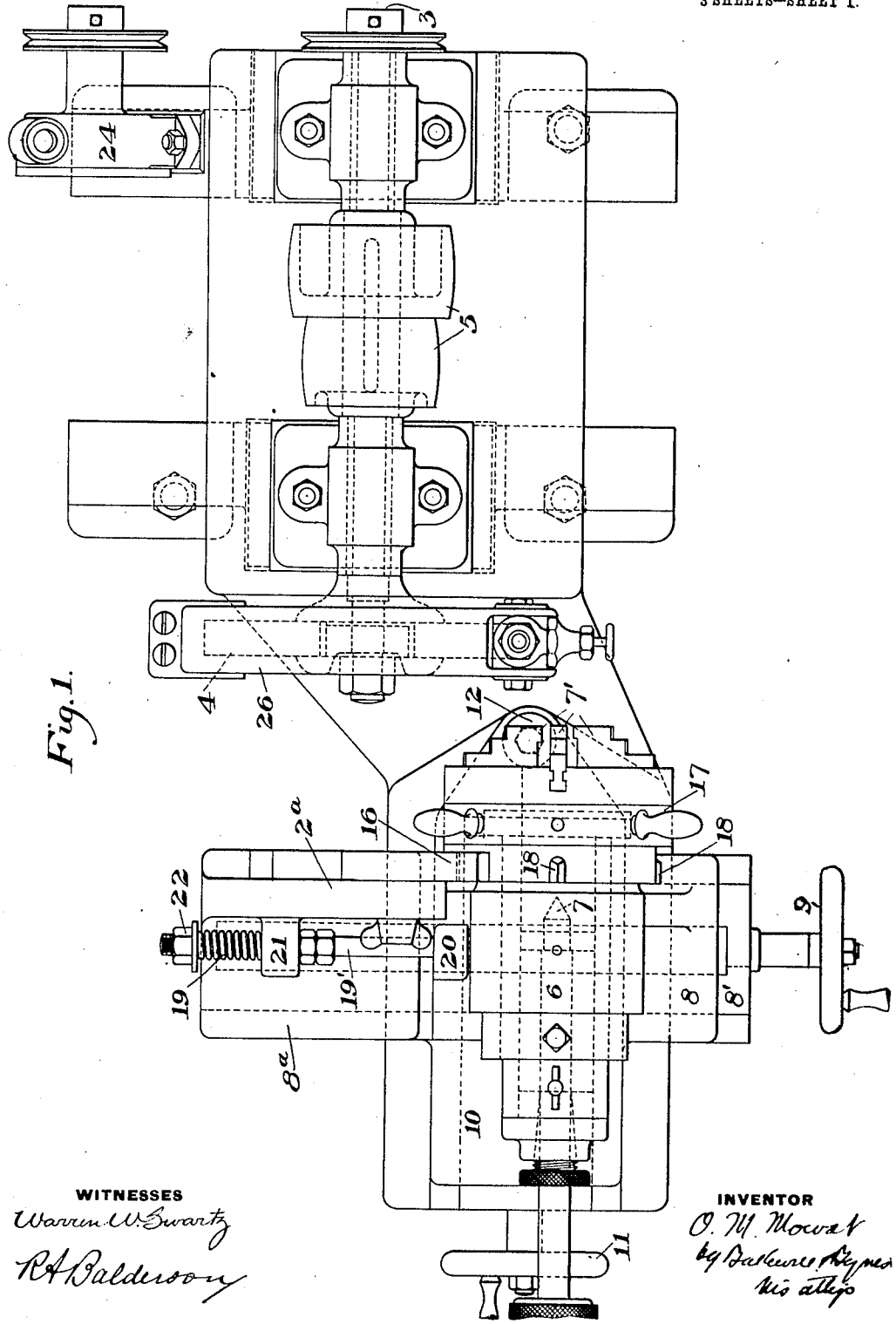

No. 856,978. PATENTED JUNE 11, 1907.
O. M. MOWAT.
TAP GRINDING MACHINE.
APPLICATION FILED NOV. 3, 1905.

3 SHEETS—SHEET 1.

WITNESSES
Warren W. Swartz
R. A. Balderson

INVENTOR
O. M. Mowat
by Bakewell Byrnes
his attys

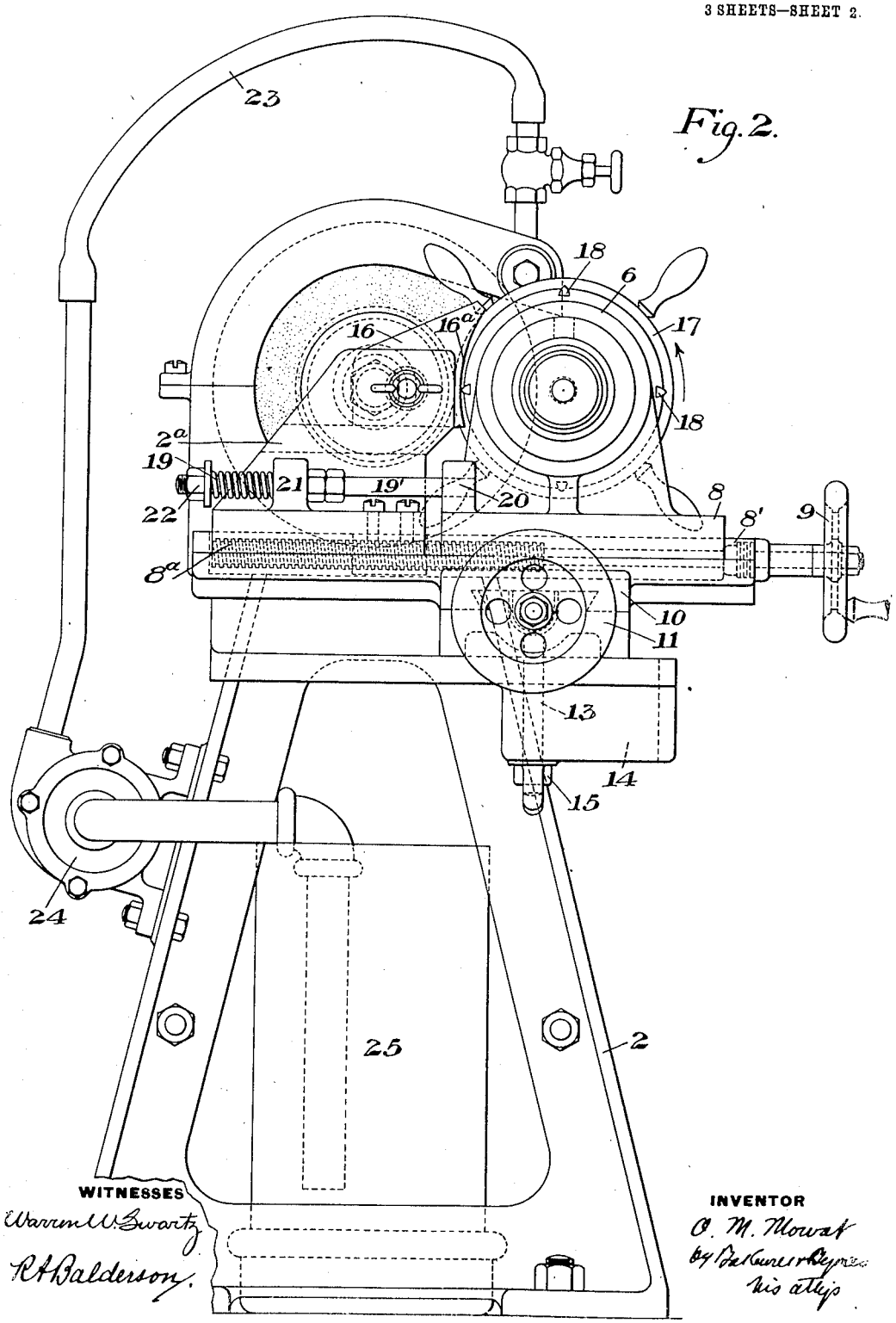

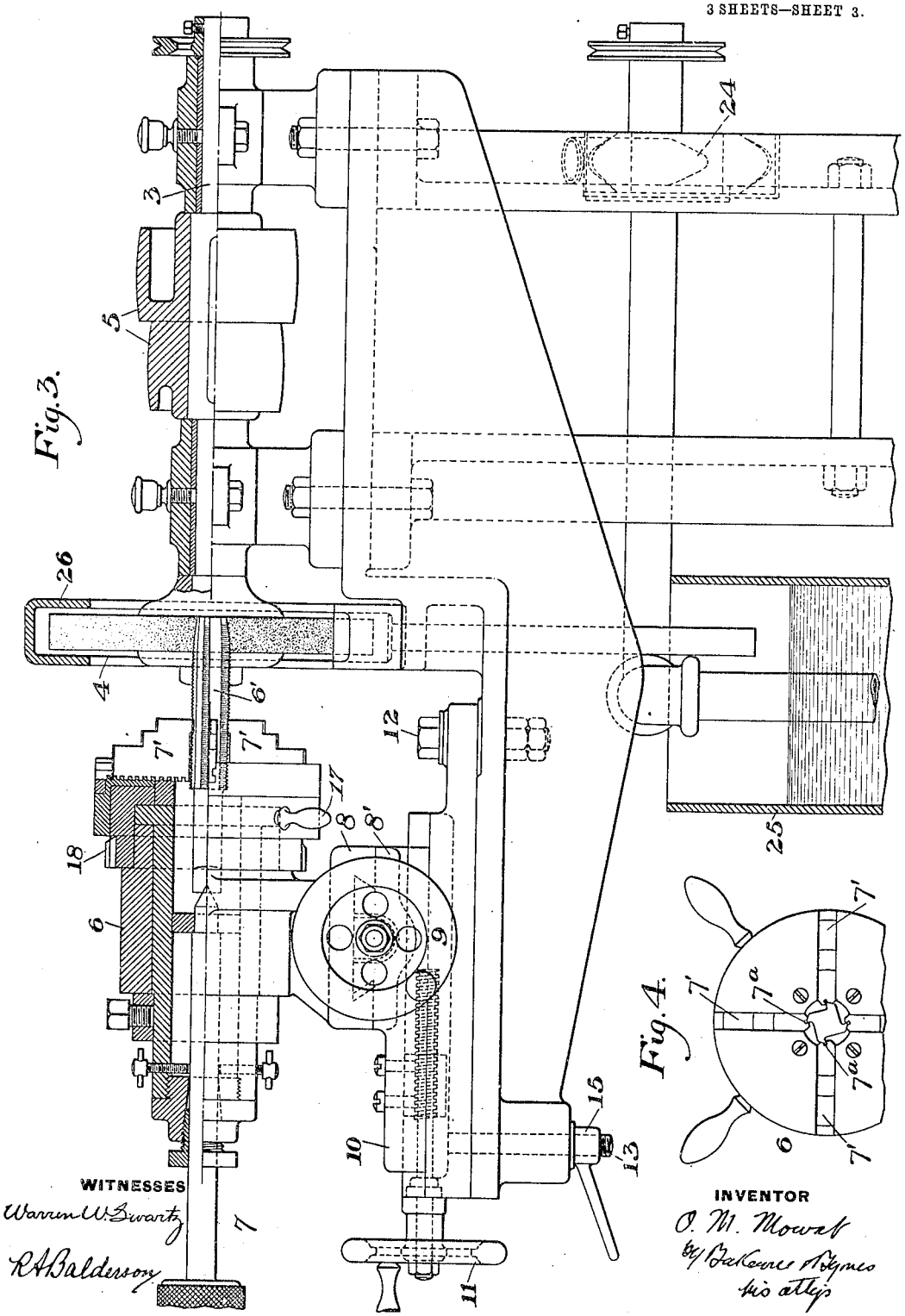

UNITED STATES PATENT OFFICE.

OLIVER M. MOWAT, OF McKEESPORT, PENNSYLVANIA, ASSIGNOR TO NATIONAL TUBE COMPANY, OF PITTSBURG, PENNSYLVANIA, A CORPORATION OF NEW JERSEY.

TAP-GRINDING MACHINE.

No. 856,978.          Specification of Letters Patent.          Patented June 11, 1907.

Application filed November 3, 1905. Serial No. 285,679.

*To all whom it may concern:*

Be it known that I, OLIVER M. MOWAT, of McKeesport, Allegheny county, Pennsylvania, have invented a new and useful Tap-Grinding Machine, of which the following is a full, clear, and exact description, reference being had to the accompanying drawings, forming part of this specification, in which—

Figure 1 is a plan view of the machine combining my invention; Fig. 2 is an end elevation of the same; Fig. 3 is a front elevation partly in section; and Fig. 4 is a face view of the chuck with the tap in position therein.

The invention is designed to provide a simple machine, by means of which the point ends of taps for pipe couplings and the like may be rapidly and accurately ground concentric to the cutting points of the taps and ground with the desired taper and the proper clearance, and the invention consists in the combination with a suitable grinding wheel mounted to revolve on a fixed axis, of a tap holding and turning chuck having novel means for holding the tap in the chuck and in proper relation to said wheel, together with an eccentric guide member, in co-operative relation with the chuck, to actuate the latter in a manner to provide for the backing off, or clearance, of the tap points.

The invention also consists in the novel construction, arrangement and combination of the parts, all substantially as hereinafter described and pointed out in the appended claims.

In the accompanying drawings, 2 designates a suitable frame upon which is journaled a horizontal shaft 3 carrying the grinding wheel 4 and driven by the pulleys 5. 6 is the tap-holding chuck having the adjustable center 7 for the end of the tap 6' and the jaws 7' for clamping the cutting portion thereof. Frequently in tempering the taps become slightly warped.

In order to insure the taper point of the tap being ground concentric with its center the tap 6' is grasped with its point projecting only the required amount beyond the face of the chuck to enable the desired length of taper to be ground by the grinding wheel without bringing the face of the chuck into contact with the wheel. The adjustable center 7 is shifted in the chuck so as to center and support the inner end of the tap while it is being ground.

The grasping jaws of the chuck are specially formed to grasp and hold the highly tempered points of the tap-bits, being provided with recesses $7^a$ in their clamping faces, as shown in Fig. 4, into which the bit points enter and are prevented from injury by contact with such faces. The said chuck is mounted upon a base portion 8 which is arranged to slide transversely of the machine upon the guides 8'. The base 8 is yieldingly connected by means of the rod 19' with the auxiliary slide $8^a$, and the base 8 and slide $8^a$ are actuated transversely to the face of the chuck by means of the hand wheel and screw 9. The base 8 is also adapted to be moved toward and from the slide $8^a$ by means of the eccentric guide to be presently described. The base portion 8 and slide $8^a$ are in turn mounted upon sub-base 10 for movement longitudinally toward and away from the face of the grinding wheel 4, and for this purpose the actuating screw and hand wheel 11 are provided. The sub-base 10 is pivoted to the frame of the machine at 12 to swing in a horizontal plane, and its swinging movement is limited by a depending stud 13, which passes through a slot 14 (shown by dotted lines in Fig. 2), its adjustment being secured by nut 15 on the lower threaded end of the stud. This swinging movement of the chuck as a whole, about the center 12, enables the end of the tap to be brought into any desired angular relation to the face of the grinding wheel, whereby the desired taper may be obtained.

16 is the eccentric guide which is fixed to the arm $2^a$ of the frame $8^a$. This guide has a curved face $16^a$ which is eccentric with respect to the center of the chuck, the amount of its eccentricity being equal to the amount of backing off or clearance to be given the ends of the tap bits. Secured to the tap-rotating hand wheel 17 of the chuck 6, and equally spaced thereon, are as many lugs or projections 18 as there are cutting edges on the tap to be ground. These lugs or projections are peripherally located so that when the wheel 17 is turned in the direction of the arrow (Fig. 2), they successively engage the eccentric face $16^a$ of the guide 16 and thereby force the chuck bodily upon the guides 8' in a direction transverse to its longitudinal axis, so that when the tap is turned in the chuck upon the center 7 by means of the said hand wheel, the bits, instead of being ground to a true circle, are ground with an eccentricity, or clearance, equal to that of the guide-face 16ª. The movement of the chuck imparted thereto by the said guide-face is resisted by a spring 19, seated upon a rod 19' connected to the chuck base at 20, the spring being confined between the rod-bearing 21 and the nut 22 at the free end of said rod. The purpose of this spring is to effect the return movement of the chuck and its support when moved by the eccentric in the manner described, and to insure an exact movement thereof.

The guide 16 is made removable, so that if desired different guides may be used interchangeably upon the machine in order to give any desired clearance grind.

23 is the water-supply pipe for the grinding wheel, fed by a suitable pump 24, drawing its supply from the tank 25, and 26 is a guard for the grinding wheel.

By means of the arrangement of the chuck above described, it will be readily seen that it can be quickly and conveniently operated to bring the tap points into correct relation to the grinding wheel and that the grinding may be conveniently and rapidly perfected.

It will be obvious that various changes may be made in the details of construction and arrangement which I have herein shown and described, without departing from the spirit and scope of my invention as defined in and by the appended claims:—

1. In a tap-grinding machine, the combination with a grinding wheel rotating upon a fixed axis, of a tap holding chuck having a longitudinal and an angular adjustment, and means whereby as the tap is rotated in the chuck, the latter is moved with respect to the wheel; substantially as described.

2. In a tap-grinding machine, the combination with a grinding wheel, of a movable tap-holding chuck, having a tap-rotating member, a fixed eccentric guide adjacent to the said member, and means on said member contacting with the said guide when the member is rotated; substantially as described.

3. In a tap-grinding machine, a grinding wheel arranged to rotate about a fixed axis, a tap-holding chuck having a tap-turning member, a support for the chuck having means for permitting the chuck to be moved longitudinally, transversely and angularly with respect to the wheel, and eccentric means for moving the chuck transversely to its longitudinal axis when said member is turned; substantially as described.

4. In a tap-grinding machine, the combination with a tap-holding chuck movable transversely with respect to its longitudinal axis, and having a tap-turning member provided with spaced lugs or projections, a fixed guide member having an eccentric face arranged to be engaged by said lugs or projections, and a spring acting upon the chuck in the opposite direction; substantially as described.

5. In a tap-grinding machine, a tap-holding and rotating chuck, a transversely movable base upon which the chuck is mounted, a longitudinally and angularly adjustable sub-base upon which the first named base is mounted, and eccentric means automatically coöperating with the chuck to form a clearance grind as the tap is rotated in the chuck; substantially as described.

6. In a tap-grinding machine, the combination of a grinding wheel, a tap-holding and rotating chuck mounted for longitudinal, lateral and angular movement, and means for effecting a lateral movement of said chuck when the tap is rotated; substantially as described.

In testimony whereof, I have hereunto set my hand.

OLIVER M. MOWAT.

Witnesses:
GEO. B. BLEMING,
RICHARD D. LITTLE.